United States Patent [19]

Suda et al.

[11] Patent Number: 4,955,127
[45] Date of Patent: Sep. 11, 1990

[54] AUTOMATIC TOOL EXCHANGING DEVICE FOR A MACHINE TOOL

[75] Inventors: Nobuyuki Suda; Akihiko Fujimoto; Ryuji Suzuki, all of Yamanashi, Japan

[73] Assignee: Fanuc Ltd., Yamanashi, Japan

[21] Appl. No.: 360,915

[22] PCT Filed: Aug. 8, 1988

[86] PCT No.: PCT/JP88/00784

§ 371 Date: Apr. 6, 1989

§ 102(e) Date: Apr. 6, 1989

[87] PCT Pub. No.: WO89/01387

PCT Pub. Date: Feb. 23, 1989

[30] Foreign Application Priority Data

Oct. 8, 1987 [JP] Japan ............................... 62-198284

[51] Int. Cl.$^5$ ............................................. B23Q 3/157
[52] U.S. Cl. ........................................ 29/568; 29/26 A
[58] Field of Search .................. 29/568, 26 A; 211/1.5

[56] References Cited

U.S. PATENT DOCUMENTS 4,827,600 5/1989 Miyano ................................ 29/568

FOREIGN PATENT DOCUMENTS

| 60-232845 | 11/1960 | Japan . |
| 60-155338 | 8/1985 | Japan . |
| 114840 | 5/1988 | Japan .................................... 29/568 |
| 63-41700 | 8/1988 | Japan . |
| 2842 | 1/1989 | Japan .................................... 29/568 |
| 51245 | 2/1989 | Japan .................................... 29/568 |

Primary Examiner—Daniel W. Howell
Attorney, Agent, or Firm—Armstrong, Nikaido, Marmelstein, Kubovcik & Murray

[57] ABSTRACT

An automatic tool exchanging device for a machine tool, comprising a stopper block (5, 5') attached to a magazine supporting member (2) supporting a magazine (1) at the lower end thereof and capable of swinging to the front and rear, and pulled by an elastic member (8) having one end connected to the upper end of the magazine supporting member (2). Upon arrival of the magazine (1) at a standby position from a tool exchanging position, a stopper (4, 4', 11) is engaged with the stopper block (5, 5') to prevent vibration of the magazine (1). A desired tool among various tools stored in the turret magazine is selected automatically and automatically exchanged for a tool on the machine tool.

5 Claims, 9 Drawing Sheets

AUTOMATIC TOOL EXCHANGING DEVICE FOR A MACHINE TOOL

DESCRIPTION

1. TECHNICAL FIELD

The present invention relates to an automatic tool changing device for a machine tool, which device is capable of automatically exchanging a tool on the machine tool for a desired tool from among various tools stored in a turret magazine.

2. BACKGROUND ART

Automatic tool changing devices have been developed which, when necessary, can select a required tool from among a plurality of tools stored in a magazine.

The applicant of the present patent application has invented and has applied for a patent for such a tool changing device (Japanese Patent Application No. 56-145242). The construction of this tool changing device is shown in FIG. 6A, in which the machine tool is being used for a machining operation and a tool is fastened to the spindle, and FIG. 6B, in which the machine tool is in a tool changing position whereat a tool is released from the spindle and fixed in a magazine.

As shown in FIGS. 6A and 6B, this tool changing device of a prior art comprises a bevel gear 71 joined to the end of a spindle X rotatably supported on a spindle head 7, a magazine 1 storing a plurality of tools 72 and able to move along the spindle head 7, and a bevel gear 21 engaged with the bevel gear 71.

When exchanging tools after a machining process is completed, the tool 72 is unclamped from the spindle X with a tool setting and removing means, not shown, including a draw bar, the tool 72 on the spindle X is removed therefrom by raising the spindle head 7 to a position at which the bevel gears 21 and 71 are engaged as shown in FIG. 6B, while the magazine 1 remains at the same position, rotating the spindle X to rotate the magazine 1 and bring a required tool 72 opposite to the spindle X, inserting and attaching the required tool to the spindle X with the tool setting and removing means including the draw bar, and then raising the magazine 1 along the spindle head 7 to disengage the bevel gear 21 from the bevel gear 71, whereby the machine tool is returned to a machining position.

In this state, one of the tool holding parts of the magazine 1 remains near the end of the spindle X, but machining can be performed, as the magazine 1 is not connected to the spindle X.

This tool exchanging device is not equipped with an individual motor for exchanging tools and the magazine thereof is rotated for selecting a desired tool by the motor for rotatively driving the main spindle. Accordingly, the tool exchanging device can be controlled easily for indexing, has a simple construction and is useful for industrial application.

In the foregoing tool exchanging position, since the tool holding part of the magazine remains near the end of the spindle, and the tools held on the adjacent tool holding parts remain within the machining zone, unavoidably the space available for the machining operation is reduced.

DISCLOSURE OF THE INVENTION

An object of the present invention is to solve the foregoing problem in the conventional tool exchanging device by retracting the magazine to a standby position after exchanging the tools, by advancing the magazine to a tool exchanging position so that sufficient space becomes available for the machining operation. Improvements are made to the tool exchanging device to prevent the tools from being detached from the magazine by vibration produced when retracting the magazine to the standby position.

For example, in an embodiment shown in FIG. 1, an operating cam 6 is attached to a spindle head 7 formed integrally with a Z slider S, which slides vertically along a column C between a lower working (machining) position and an upper tool exchanging position, a magazine supporting member 2 is supported pivotally on a pivot shaft 01 on an upper column part C, a strong extension spring 8 is extended between the upper end of the supporting member and the column C, i.e., a fixed frame, to constantly bias the supporting unit 2 in the direction of an arrow F so that the supporting member 2 rests on a stopper 10 provided on the column C, and a roller R and a stopper block 5 are fixed to the side surface of the supporting member 2.

A two-arm lever 3 and a two-arm lever stopper 4 are supported pivotally on a pivot shaft 02 on the column C serving as a fixed frame. One end of the two-arm lever 3 has a slot 31 engaged with the roller R and the other end holds a cam follower 30 associated with the operating cam 6. The front end of the lever stopper 4 holds a follower 41 engaged with a recess 50 formed in the stopper block 5, and the lower end holds a cam follower 40 associated with the operating cam 6.

The configuration shown in FIG. 1 shows (a) a state in which the cam follower 30 of the operating lever 3 has moved away from the operating cam 6 on the spindle head 7, namely, the spindle head 7 is moving downward after the completion of tool changing operation or (b) a state in which the cam follower is about to be engaged with the operating cam 6, namely, the spindle head 7 is moving upward for a tool exchanging operation. In state (a), when the cam follower 30 is separated from the operating cam 6, the magazine supporting member 2 is made to swing in the direction of the arrow F as far as the stopper 10, by the extension elastic member 8. Since the magazine 1 is suspended from the lower end of the magazine supporting member 2, the lower portion of the magazine supporting member 2 tends to swing and vibrate further to the front (in the direction of an arrow Q) due to the inertial force and deflection of the structure. Nevertheless, the engagement of the follower 41 supported on the front end of the lever stopper 4 and the recess 50 of the stopper block 5 prevents the forward swing and vibration of the magazine 1, so that the tools are prevented from being detached from the magazine 1 by the swinging and vibration of the magazine 1.

In state (b), the cam 6 moves upward to push the cam followers 30 and 40 to the front, and thus the magazine supporting member 2 is drawn backward, namely, toward the spindle head 7, by the operating lever 3, and the follower 41 supported on the front end of the lever stopper 4 slides along the front slope 51 of the stopper block 50, so that the magazine 1 can be moved to the tool exchanging position without hindrance.

Since the magazine is thus retracted to a standby position during the machining operation, a wide space is available for the machining, thereby facilitating the machining work, and since the inertial vibration of the magazine caused by the rapid retraction of the magazine to the standby position is suppressed by the stopper, there is no possibility that the tools will be detached from the magazine.

Further, since the vibration of the magazine attributable to a collision of the magazine supporting member with the stopper can be prevented, a rapid tool exchange is possible.

BRIEF D OF THE DRAWINGS

Figure 5A:
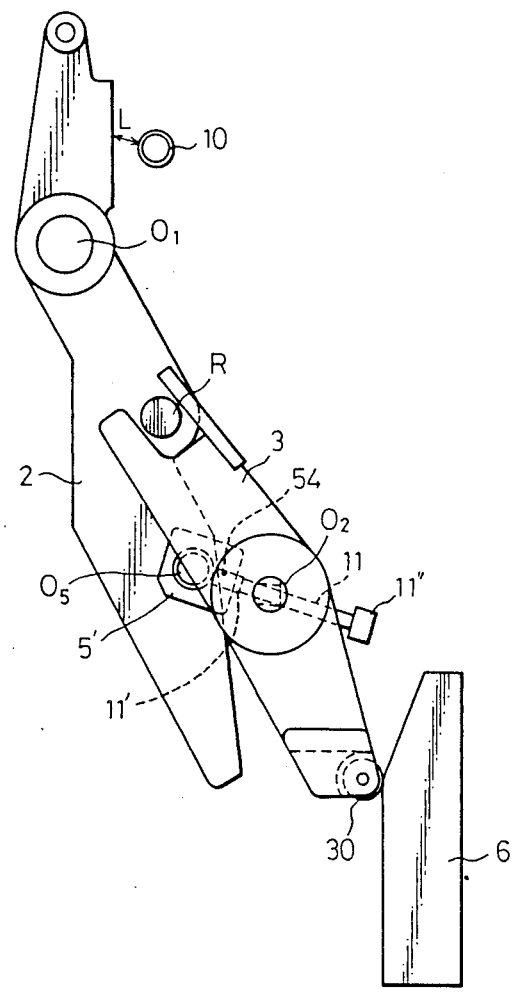
Figure 5B:
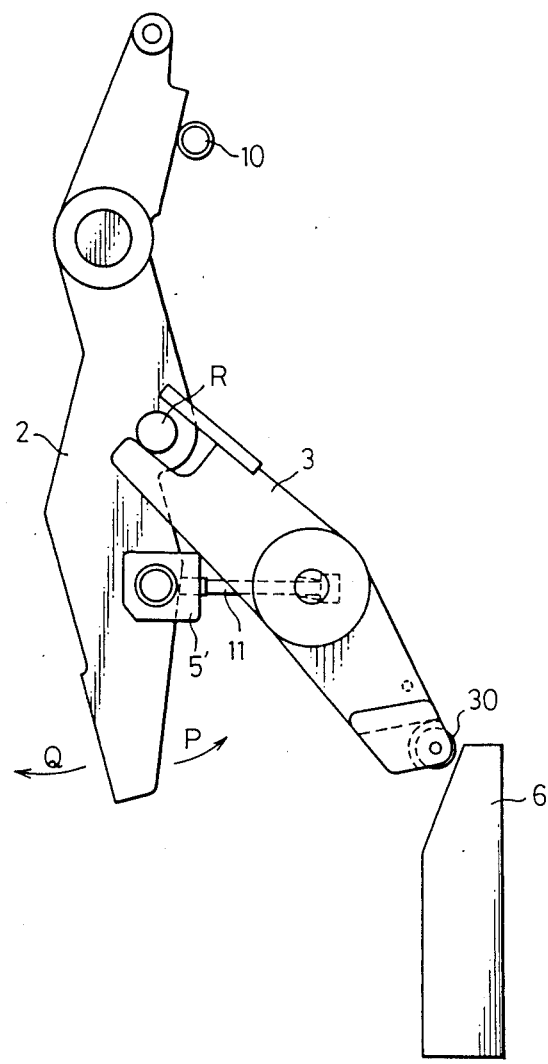
Figure 6A:
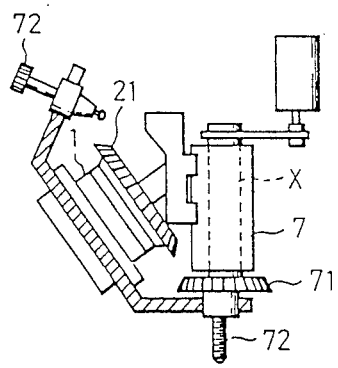
Figure 6B:
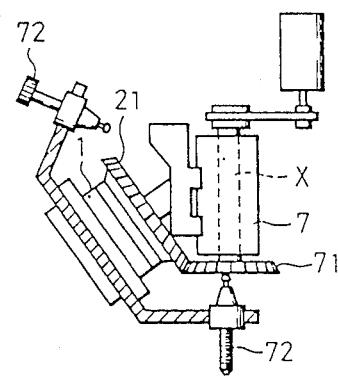

FIGS. 5A and 5B are enlarged side elevation views of an automatic tool exchanging device in a third embodiment according to the present invention, in which the magazine is at a tool exchanging position in FIG. 5A and is at a standby position in FIG. 5B; and FIGS. 6A and 6B are illustrations of assistance in explaining a conventional tool exchanging device, in which the tool exchanging device is shown during a machining operation in FIG. 6A and during tool exchanging operation.

BEST MODE OF CARRYING OUT THE INVENTION

First Embodiment

Figure 1:
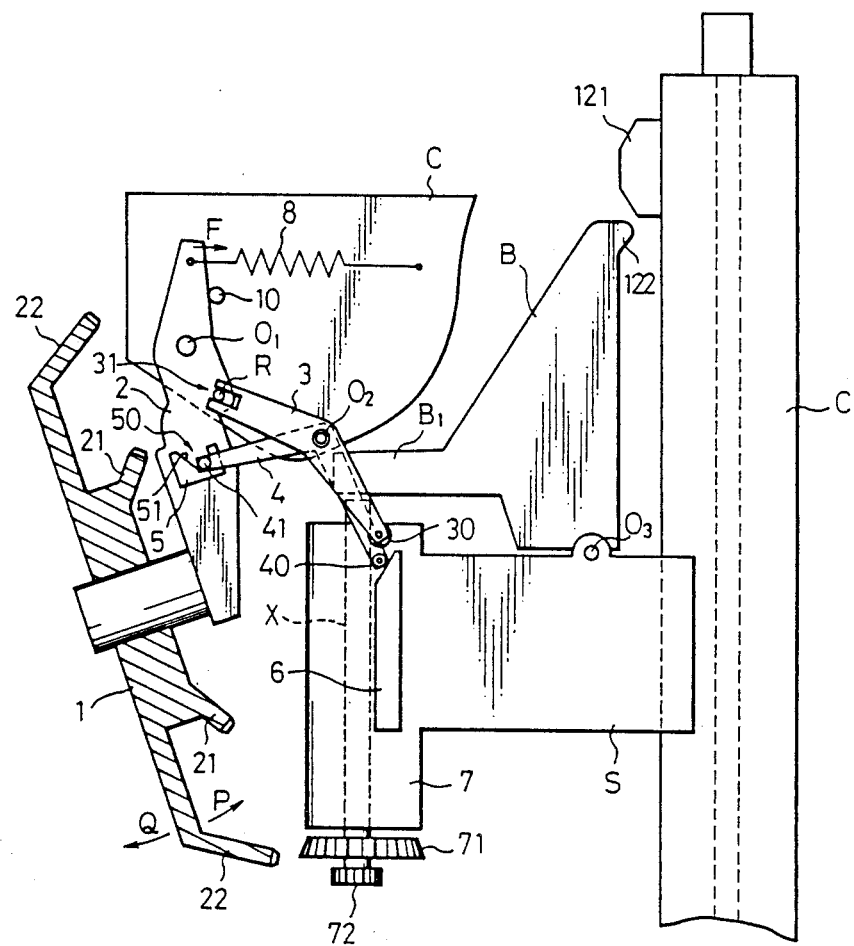
FIG. 1 is a schematic side elevation view of an automatic tool exchanging device in a first embodiment according to the present invention.
Figure 2A:
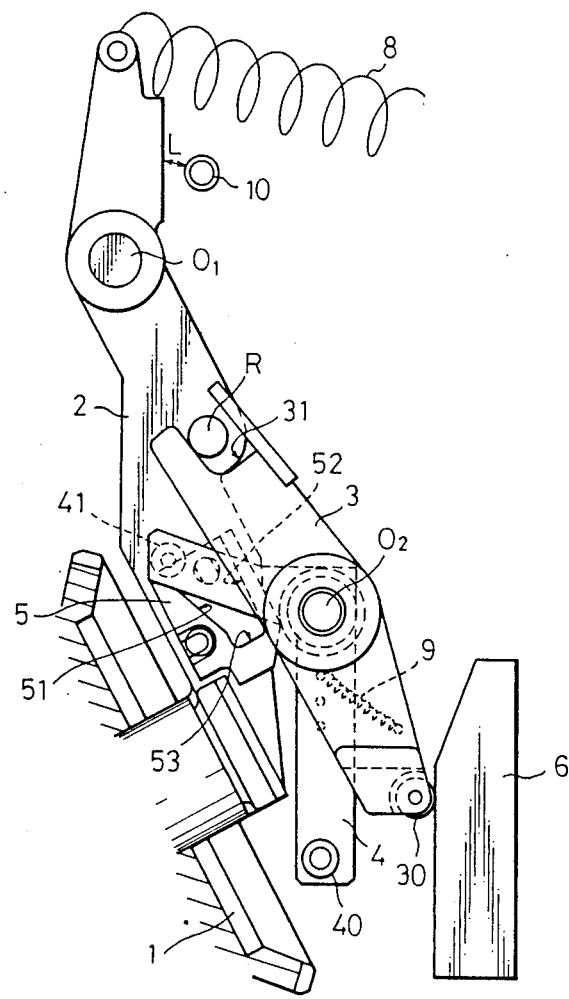
FIGS. 2A and 2B are enlarged side elevation views of an essential portion of the automatic tool exchanging device in the first embodiment, in which the magazine is at a tool exchanging position in FIG. 2A and is at a standby position in FIG. 2B.
Figure 2B:
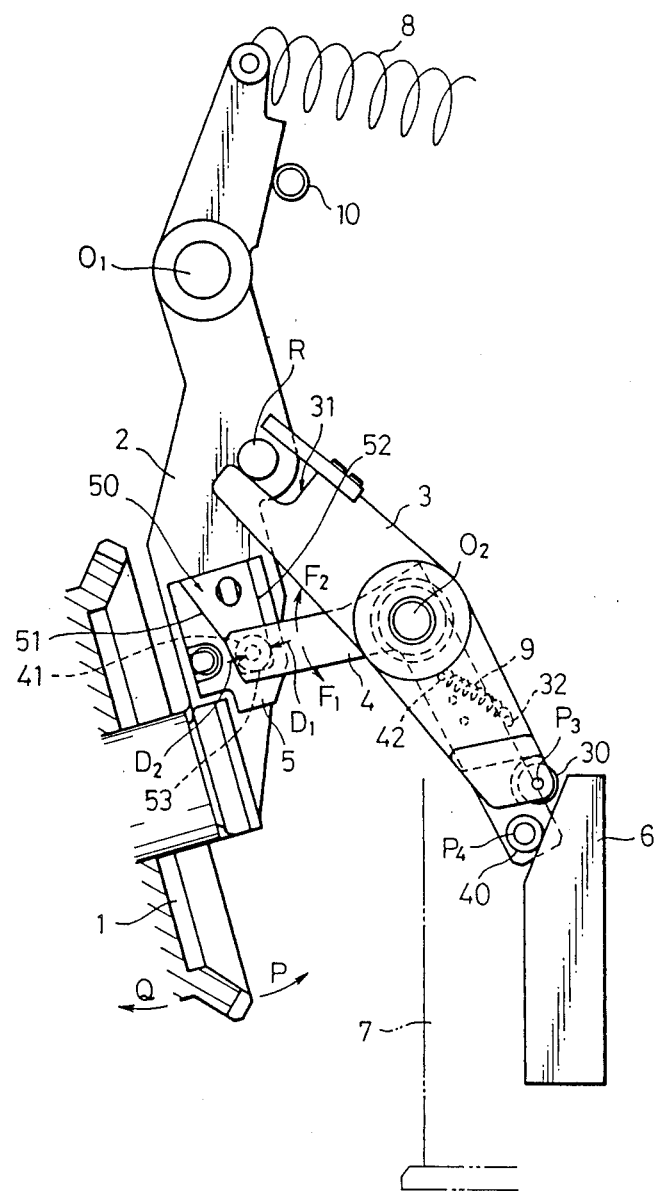
Figure 3:
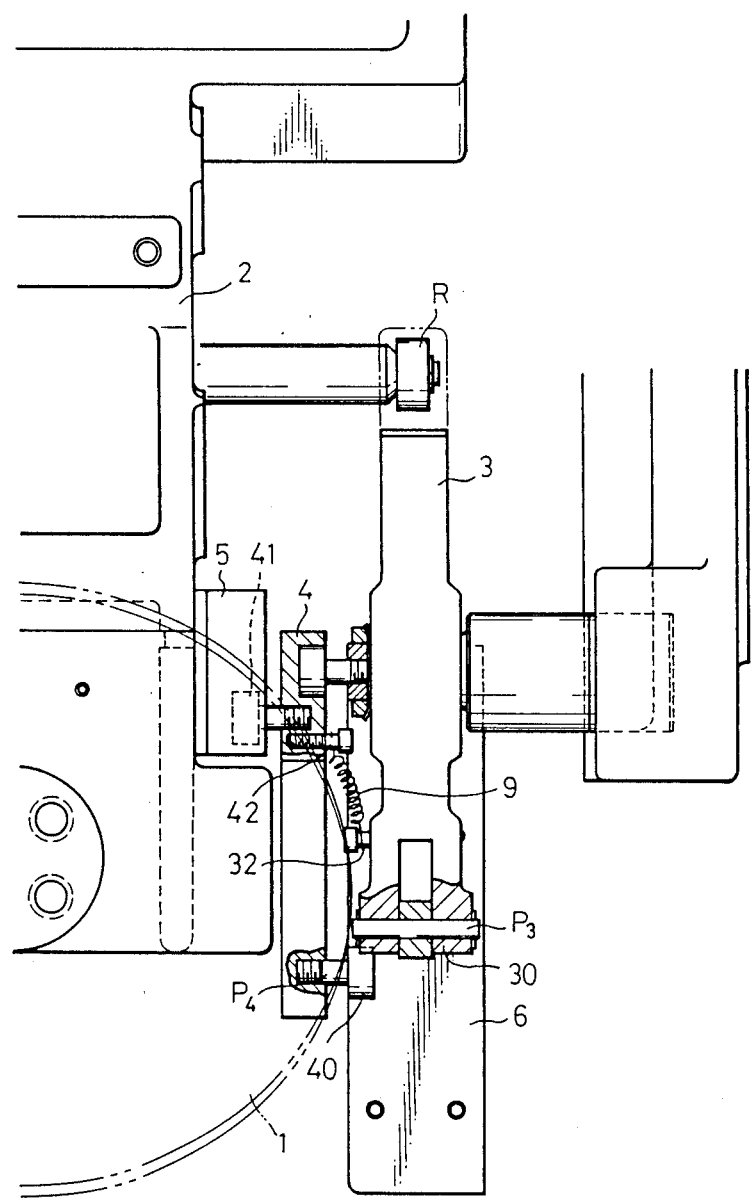
FIG. 3 is an enlarged front elevation view of the essential portion of the automatic tool exchanging device in the first embodiment.

FIG. 1 is a schematic side elevation view of assistance in explaining the mechanism of an automatic tool exchanging device in a first embodiment according to the present invention, FIGS. 2A and 2B are enlarged views of an essential portion of the automatic tool exchanging device, and FIG. 3 is a front elevation view of the essential portion thereof. Referring to the drawings, a Z slider S slides vertically along a column C between a lower working position and an upper tool exchanging position, a spindle head 7 formed integrally with the Z slider S supports a spindle X for rotation and is provided at the lower end thereof with a bevel gear 71, the extremity of a tool setting and removing device, not shown, disposed within the spindle X, projects from the upper end of the spindle head 7 and is able to engage the operating arm B1 of an operating plate B pivotally supported on a pivot shaft 03 attached to the slider S, and a cam 6 is attached to the outer surface of the spindle head 7.

A magazine 1 is attached to the lower end of a magazine supporting member 2 pivotally supported by a pivot shaft 01 on the column C. An extension spring 8 having one end connected to the upper end of the magazine supporting member 2 biases the magazine supporting member 2 so that the magazine supporting member 2 rests on a stopper 10 attached to the column C. A roller R is attached to the supporting member 2 at a position below the pivot shaft 01, and a block 5 is attached to the supporting member 2 at a position further below the pivot shaft 01 and near the center of mass of the supporting member 2.

A two-arm operating lever 3 supporting a cam follower 30 on a pin P3 at the lower end thereof and having a slot 31 formed at the front end thereof to slidably receive the roller R, and an L-shaped two-arm lever stopper 4 supporting a cam follower 40 on a pin P4 at the lower end thereof and a follower 41 at the front end thereof, are supported pivotally by the pivot shaft 02 on the column C.

The block 5 has a recess 50 having an inclined front surface 51, a vertical back surface 52 and a bottom surface 53. The recess 50 and the lever stopper 4 are constructed so as to meet a geometric relationship in which a moment tending to move the follower 41 of the lever stopper 4 downward (in the direction of an arrow F1 in FIG. 2B) is generated when the magazine supporting member 2 is pulled to the front (in the direction of an arrow D1 in FIG. 2B) with the follower 41 supported on the front end of the lever stopper 4 resting on the bottom surface 53 of the recess 50, and a moment tending to move the follower 41 upward (in the direction of an arrow F2 in FIG. 2B) is generated when the magazine supporting member 2 is pulled backward (in the direction of an arrow D2 in FIG. 2B).

Where the magazine supporting member 2 is resting on the stopper 10, namely, where the tool is at a working position and the magazine 1 is retracted to a standby position, the follower 41 supported on the front end of the lever stopper 4 rests on the bottom surface 53 of the recess 50 of the block 5, and the cam follower 40 supported on the lower end of the lever stopper 4 is positioned below the cam follower 30 supported on the lower end of the operating lever 3. A spring 9 is connected at the lower end thereof to a pin 32 attached to the operating lever 3 and at the upper end thereof to a pin 42 attached to the lever stopper 4, to urge the lever stopper 4 counterclockwise (in FIGS. 1, 2A and 2B) relative to the operating lever 3.

While the tool is machining, the cam follower 30 of the operating lever 3 is separated from the cam 6, the magazine supporting member 2 is pulled by the strong spring 8 so as to rest on the stopper 10, and the magazine 1 is thus retracted to a front retracted position (a standby position).

When exchanging the tools, the cam 6 is raised together with the Z slider S to push the cam follower 30 with the inclined cam surface, whereby the operating lever 3 is turned clockwise (FIG. 2A) on the pivot shaft 02 to a position shown in FIG. 2A, and at the same time, the magazine supporting member 2 is turned counterclockwise (FIG. 2A) on the pivot shaft 01, so that the magazine 1 is shifted to the tool exchanging position. At this time, the cam 6 acts on the cam follower 40 supported on the lower end of the lever stopper 4 to push up the follower 41 supported on the front end of the lever stopper 4 from the recess 50 of the block 5, whereby the follower 41 is caused to slide upward along the inclined front surface 51 to a position shown in FIG. 2A.

When the magazine 1 is positioned at the tool exchanging position, a bevel gear 21 fixed to the magazine 1 engages a bevel gear 71 provided in the lower portion of the spindle head 7, the cam 122 of the operating plate B engages a cam 121 provided on the column C, and the operating arm B1 then operates the tool setting and removing means, not shown, provided in the spindle X to complete the tool exchanging operation.

After the tool exchanging operation is completed, the Z slider S is lowered rapidly and thus the cam follower 30 is released from the cam 6. Consequently, the magazine supporting member 2 is turned rapidly by the pulling force of the strong spring 8 so that a portion of the magazine supporting member 2 moves by a distance L and collides with the stopper 10 (FIG. 2B), and the operating lever 3 is turned counterclockwise by the roller R of the magazine supporting member 2. At the same time, the follower 41 of the lever stopper 4 is brought immediately into contact with the bottom surface 51 of the recess 50, since the lever stopper 4 is urged counterclockwise (FIG. 2B) relative to the operating lever 3 by the spring 9 and the block 5 moves together with the magazine supporting member 2 to the front.

The magazine 1 has a plurality of grippers 22 holding tools, and accordingly, the center of mass of the assembly of the magazine supporting member 2 and the magazine 1 joined to the lower end of the magazine supporting member 2 is far below the pivot shaft 01. Therefore, when the magazine supporting member 2 is caused to collide with the stopper 10 by the pulling force of the strong spring 8, the magazine 1 tends to vibrate due to its own inertial force, first in the direction of an arrow Q and then in the direction of an arrow P. Since, however, the block 5 is provided in the lower portion of the magazine supporting member 2, and the bottom surface 53 of the block 5 is positioned near the center of mass of the magazine supporting member 2, the lever stopper 4 prevents the vibration of the magazine supporting member 2 attributable to the sudden stop of the magazine supporting member 2.

Large amplitude vibrations generated upon the sudden stop of the magazine supporting member 2 accompanied by the deflection of the magazine supporting member 2 are suppressed and the vibration is prevented, and consequently, the risk of the tools being detached from the grippers 22 is avoided and a high-speed tool exchanging operation is achieved.

Since the magazine 1 is retracted to a standby position away from the spindle head 7, a wide working space (space for machining work) is secured and thus the machining work is facilitated.

The follower 41 supported on the front end of the lever stopper 4 is raised smoothly from the bottom surface of the recess 50 of the block 5 by making the cam 6 act on the cam follower 40 supported on the lower end of the lever stopper 4, and the flying motion of the lever stopper 4 is prevented by the extension spring 9 extended between the lever stopper 4 and the operating lever 3, which enables a high-speed tool exchanging operation.

Second Embodiment

Figure 4A:
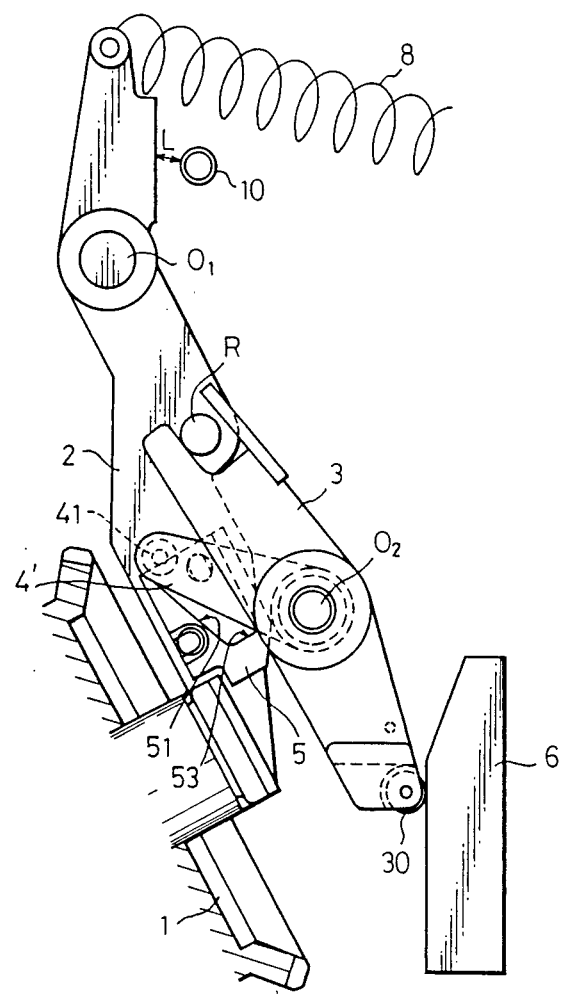
FIGS. 4A and 4B are enlarged side elevation views of an automatic tool exchanging device in a second embodiment according to the present invention, in which the magazine is at a tool exchanging position in FIG. 4A and is at a standby position in FIG. 4B.
Figure 4B:
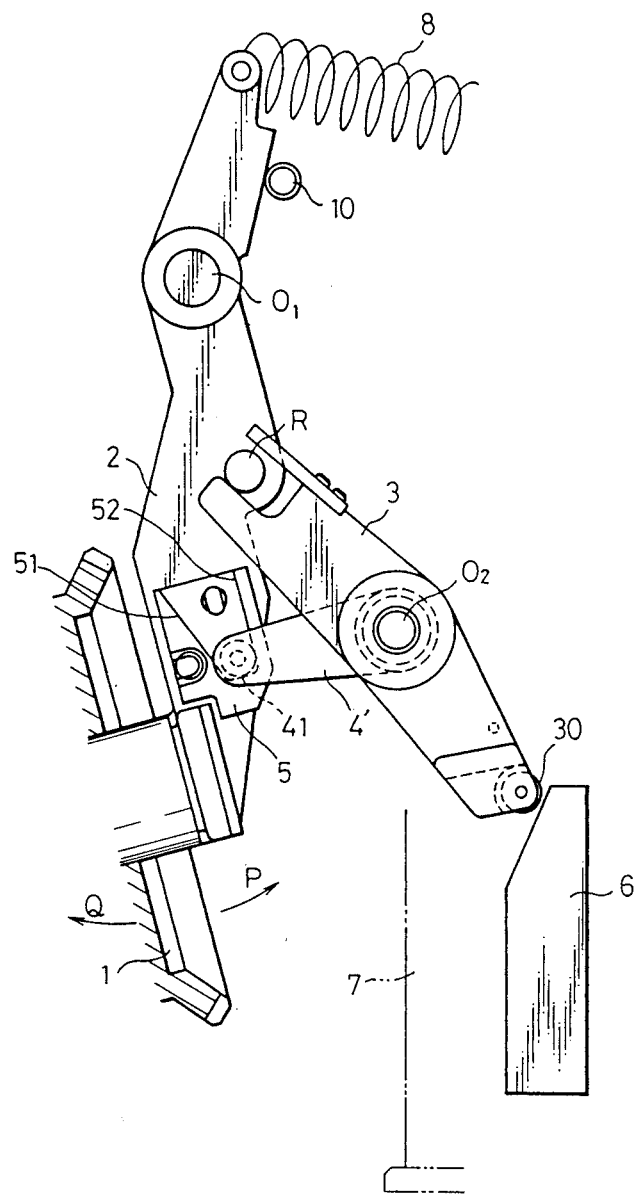

As shown in FIGS. 4A and 4B, an automatic tool exchanging device in a second embodiment according to the present invention is different from the automatic tool changing device in the first embodiment only in a stopper 4'. The stopper 4' has a base end pivotally supported coaxially with an operating lever 3, and a free end provided with a follower 41, i.e., a roller.

The action and effect of the second embodiment are the same as those of the first embodiment except that the stopper 4' must be turned upward against a small resistance in the initial stage of movement of the carriage from the standby position shown in FIG. 4B to the tool exchanging position shown in FIG. 4A. This drawback, however, is alleviated by forming the inclined surface 51 of the recess 50 of the block 5 with a higher precision than that of the inclined surface in the first embodiment.

In the second embodiment also the flying motion of the stopper 4' in high-speed tool exchanging operation is effectively prevented by urging the stopper 4' counterclockwise (FIGS. 4A and 4B) relative to the operating lever 3, with a spring.

Third Embodiment

As shown in FIGS. 5A and 5B, a block 5' having a threaded hole 54 is pivotally supported on a pivot shaft 05, and the threaded portion 11' of a bolt 11 having a stopping head 11" at the rear end thereof passed slidably through a boss supported rotatably and coaxially with the operating lever 3 and screwed fixedly in the threaded hole 54 of the block 5'. The function and effect of an automatic tool exchanging device in a third embodiment according to the present invention are the same as those of the first and second embodiments except that the stopper can be shifted more smoothly than the sliding motion of the follower along the inclined surface of the recess of the block in the second embodiment.

Modification

Although the lever stoppers 4 and 4' are supported coaxially with the operating levers 3, respectively, in the first and second embodiments, it is obvious to those skilled in the art that the desired function and effect can be obtained even if the lever stoppers 4 and 4' are not supported coaxially with the operating lever 3, respectively.

We claim:

1. An automatic tool exchanging device for a machine tool, comprising:
    a magazine supporting member (2) supporting a magazine (1) at the lower end thereof and pivotally mounted to a support by means permitting the magazine supporting member (2) to swing back and forth;
    an elastic member (8) having one end attached to the upper end of the magazine supporting member (2) and pulling the upper end of the magazine supporting member (2) in one direction;
    a stopper block (5, 5') attached to the magazine supporting member (2); and
    a stopper (4, 4', 11) engaging with the stopper block (5, 5', 11) upon arrival of the magazine (1) at a standby position from a tool exchanging position, to prevent vibration of the magazine (1).

2. An automatic tool exchanging device according to claim 1, wherein said stopper block (5) has a recess having an inclined front surface (51), a vertical rear surface (52) and a bottom surface (53), said stopper (4) is an L-shaped two-arm lever supported pivotally and having a front follower (41) which slides within the recess (50), and a lower cam follower (40) which engages a cam (6), and the stopper block (5) and the stopper (4) are disposed so that a forward pulling action of the stopper block (5) in response to pivotal movement of the magazine support member (2) generates a force to press the front follower (41) against the bottom surface (53) of the recess (50).

3. An automatic tool exchanging device according to claim 2, wherein the two-arm stopper (4), and an operating lever (3) to operate the magazine supporting member (2) for a swing motion are supported pivotally on a column (C), and an elastic member (9) is extended between a pin (32) fixed to the operating lever (3) and a pin (42) fixed to the stopper (4) to urge a first cam follower (30) supported on the operating lever (3) and a second cam follower (40) supported below the first cam follower (30) on the lower end of the stopper (4), toward each other.

4. An automatic tool exchanging device according to claim 1, wherein the stopper block (5) has a recess (50) having a inclined front surface (51), a vertical rear surface (52) and a bottom surface (53), the stopper (4') is provided with a front follower (41), which slides within the recess (50), and the stopper (4') is a pivotally supported lever.

5. An automatic tool exchanging device according to claim 1, wherein an operating lever (3) for operating the magazine supporting member (2) is mounted to a support for pivotal movement about an axis ($0_2$), a threaded hole (54) is formed in the stopper block (5'), the stopper block (5') is supported pivotally on a pivot shaft (05) attached tot he magazine supporting member (2), the stopper (11) has a front end (11') screwed in the threaded hole (54), and a rear end provided with a stopping head (11''), and the stopper (11) is slidable on the axis ($0_2$) of the operating lever (3).

* * * * *

UNITED STATES PATENT AND TRADEMARK OFFICE
CERTIFICATE OF CORRECTION

PATENT NO. : 4,955,127

DATED : September 11, 1990

INVENTOR(S) : SUDA et al

It is certified that error appears in the above-identified patent and that said Letters Patent is hereby corrected as shown below:

On the cover page, Item [30], "Oct. 8, 1987" should read --Aug. 10, 1987--.

Signed and Sealed this

Twenty-fourth Day of December, 1991

Attest:

HARRY F. MANBECK, JR.

*Attesting Officer*  *Commissioner of Patents and Trademarks*